US012617668B2

(12) United States Patent
    Julber

(10) Patent No.: US 12,617,668 B2
(45) Date of Patent: May 5, 2026

(54) APPARATUS FOR COUPLING PRESSURIZED WATER SUPPLY TO RECREATIONAL VEHICLE FRESH WATER FILL PORT

(71) Applicant: Evan L. Julber, Bend, OR (US)

(72) Inventor: Evan L. Julber, Bend, OR (US)

( * ) Notice: Subject to any disclaimer, the term of this patent is extended or adjusted under 35 U.S.C. 154(b) by 60 days.

(21) Appl. No.: 18/885,714

(22) Filed: Sep. 15, 2024

(65) Prior Publication Data

US 2026/0077996 A1     Mar. 19, 2026

(51) Int. Cl.
    *B67D 7/32*        (2010.01)
    *B60R 16/08*       (2006.01)
    *B67D 7/02*        (2010.01)

(52) U.S. Cl.
    CPC ......... *B67D 7/3227* (2013.01); *B67D 7/0288* (2013.01); *B60R 16/08* (2013.01)

(58) Field of Classification Search
    CPC .. B67D 7/3209; B67D 7/3227; B67D 7/0288; B60R 16/08
    See application file for complete search history.

(56) References Cited

U.S. PATENT DOCUMENTS 5,904,183  A  *  5/1999  Leech ..................... B60R 15/00
                                                    137/355.16
5,931,184  A  *  8/1999  Armenia ............... A47L 15/421
                                                    285/123.1

* cited by examiner

*Primary Examiner* — Timothy L Maust
(74) *Attorney, Agent, or Firm* — Sam Pierce

(57)                ABSTRACT

An apparatus for coupling a pressurized water supply to a recreational vehicle (RV) fresh water fill port is disclosed. The apparatus comprises a housing with a bayonet connector adapted to engage the RV fill port, a venturi tube within the housing for accelerating water flow, and a plurality of vent ports fluidly connected to the venturi tube for venting excess pressurized water. A deflection shroud extends from the housing to redirect vented water away from the user. The vent ports have a combined flow capacity greater than the maximum flow rate of the water supply, ensuring leak-free operation. The invention may include features such as radially positioned vent ports, a deflection shroud, UV-resistant polymer construction, a sealing gasket, and a textured deflection shroud surface. An alternative embodiment describes a coupling device for transferring pressurized water to a gravity-filled tank, incorporating a passive overpressure prevention system.

8 Claims, 4 Drawing Sheets

APPARATUS FOR COUPLING PRESSURIZED WATER SUPPLY TO RECREATIONAL VEHICLE FRESH WATER FILL PORT

BACKGROUND OF THE INVENTION

Field of Invention

The various aspects discussed herein relate to an apparatus for coupling a pressurized water supply to a recreational vehicle freshwater fill port.

Description of Related Art

Recreational vehicles (RVs) are equipped with fresh water tanks for storing potable water. These tanks are typically filled through a dedicated fill port accessible from the exterior of the RV. Conventional methods of filling RV fresh water tanks include holding a flowing garden hose to the fill port opening or using a commercially available valve with a small hose attached, which can be inserted into the fill port.

However, there are problems with existing solutions for coupling pressurized water supplies, such as garden hoses, to RV fresh water fill ports. Adapters that allow direct connection of a pressurized hose to the fill port risk over-pressurizing the fresh water tank and associated plumbing, which are not designed to withstand significant pressure. This can lead to leaks, damage, and even flooding inside the RV. Additionally, many adapters suffer from leaks at the hose connection point, resulting in wasted water and an inconvenient, messy filling experience.

Accordingly, there is a need in the art for an improved apparatus for coupling a pressurized water supply to an RV fresh water fill port. Such an apparatus should provide an efficient, leak-free connection while protecting the RV fresh water system from over-pressurization. Furthermore, the apparatus should be easy to use, compatible with standard garden hose or fresh water hoses and RV fill port designs, and minimize the risk of water spillage or spraying onto the user during operation.

The apparatus disclosed herein addresses these and other needs in the art by providing a novel coupling device with integrated overpressure protection and a user-friendly design.

BRIEF SUMMARY OF THE INVENTION

This summary is provided to introduce a selection of concepts, in a simplified format, that are further described in the detailed description of the invention. This summary is neither intended to identify key or essential inventive concepts of the invention nor is it intended for determining the scope of the invention.

The present invention relates to an apparatus for efficiently and safely coupling a pressurized water supply, such as a standard garden hose or fresh water hose, to a recreational vehicle (RV) fresh water fill port. The apparatus comprises a bayonet connector adapted to engage with flanges on the RV fill port, providing a secure and leak-free connection.

A key aspect of the invention is the inclusion of a venturi tube within the connector housing. The venturi tube is shaped to accelerate water flow from the inlet to the outlet, enabling efficient filling of the RV fresh water tank. Importantly, the housing also incorporates a plurality of vent ports fluidly connected to the venturi tube. These vent ports are strategically sized and positioned to allow venting of excess pressurized water supplied by the garden hose, thereby preventing over-pressurization of the RV fresh water tank and associated plumbing.

To enhance user safety and convenience, the apparatus further comprises a deflection shroud extending from the housing. The deflection shroud is positioned to redirect and decelerate water vented from the vent ports away from the user, minimizing the risk of splashing or spraying during operation.

Advantageously, the vent ports have a combined flow capacity greater than the maximum flow rate suppliable by a typical garden hose. This design ensures that the venturi tube can channel water to the RV fresh water fill port without leakage under normal operating conditions, providing a clean and efficient filling experience.

The invention may further include features such as radially positioned vent ports, an deflection shroud, UV-resistant polymer construction, a built-in lanyard hole for securing the apparatus, a converging-diverging venturi tube nozzle shape for optimized flow acceleration, a sealing gasket for leak prevention, and a textured deflection shroud surface for improved grip.

In an alternative embodiment, the invention is described as a coupling device for transferring pressurized water from a hose to a gravity-filled tank. This embodiment includes a connector body with a hose-receiving portion, tank-connecting portion with a releasable bayonet mount, and a main conduit fluidly connecting the two portions. An integrated passive overpressure prevention system, comprising vent apertures and a deflector, ensures that the main conduit remains substantially unpressurized during operation.

The apparatus of the present invention addresses the need for an improved coupling device that provides efficient, leak-free filling of RV fresh water tanks while protecting against over-pressurization. By incorporating novel features such as the venturi tube, vent ports, and deflection shroud, the invention solves problems associated with conventional RV water fill solutions and offers a safer, more user-friendly experience.

Additional features and advantages of the invention will be set forth in the description which follows. These and other features of the present invention will become more fully apparent from the following description, or may be learned by the practice of the invention as set forth hereinafter.

BRIEF DESCRIPTION OF THE DRAWINGS

The various exemplary embodiments of the present invention, which will become more apparent as the description proceeds, are described in the following detailed description in conjunction with the accompanying drawings, in which.

DETAILED DESCRIPTION

Figure 1:
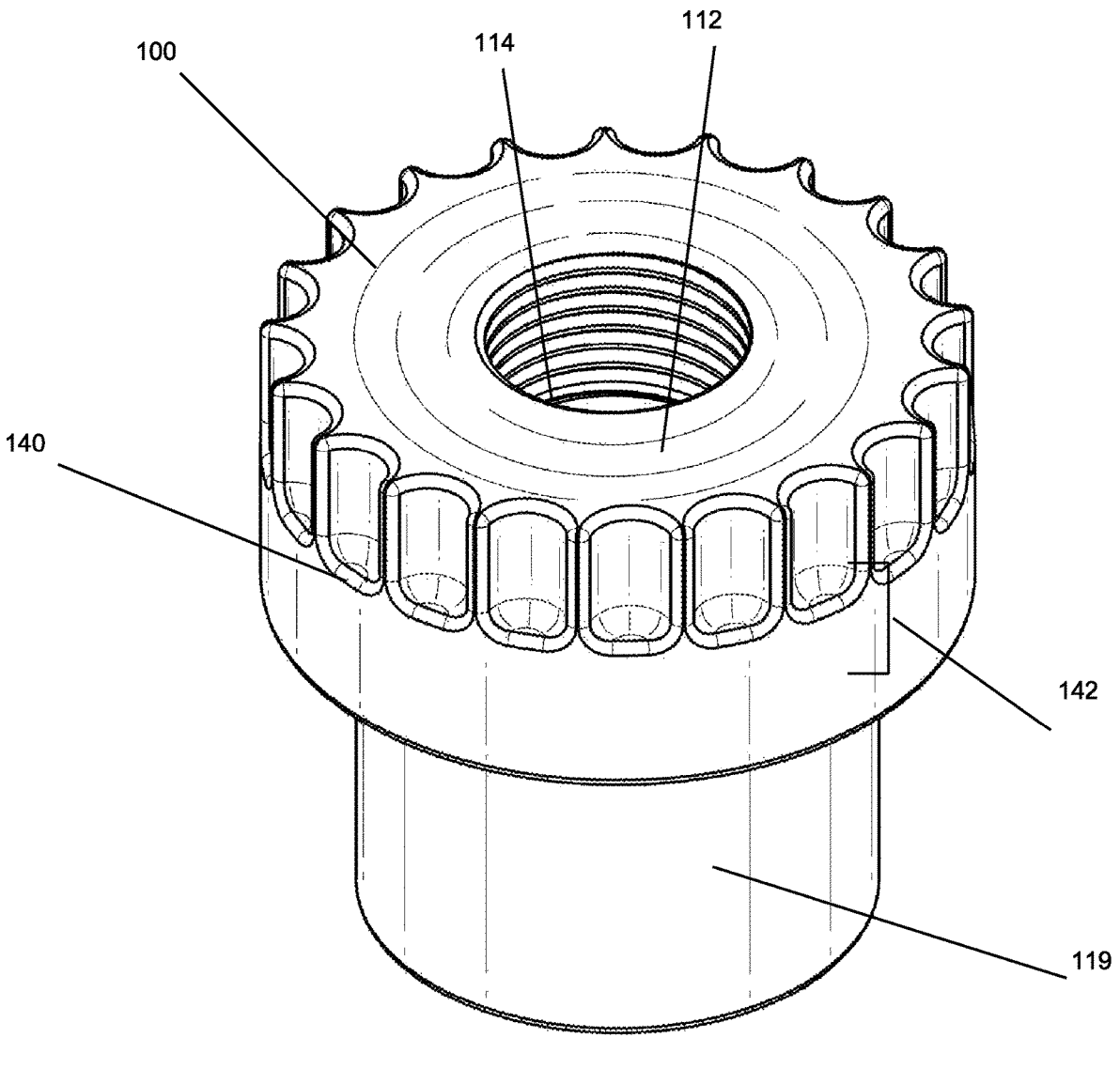
FIG. 1 shows a perspective view of an apparatus for coupling a pressurized water supply to a recreational vehicle fresh water fill port, according to one embodiment.

In the following detailed description of the preferred embodiments, reference is made to the accompanying drawings, which form a part hereof and show, by way of illustration, specific embodiments in which the invention may be practiced. It is to be understood that other embodiments may be used and structural or logical changes may be made without departing from the scope of the present invention. The following detailed description, therefore, is not to be taken in a limiting sense, and the scope of the present invention is defined by the appended claims.

The following description is provided as an enabling teaching of the present systems, and/or methods in its best, currently known aspect. To this end, those skilled in the relevant art will recognize and appreciate that many changes can be made to the various aspects of the present systems described herein, while still obtaining the beneficial results of the present disclosure. It will also be apparent that some of the desired benefits of the present disclosure can be obtained by selecting some of the features of the present disclosure without utilizing other features.

Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

The terms "a" and "an" and "the" and similar references used in the context of describing a particular embodiment of the present invention (especially in the context of certain claims) are construed to cover both the singular and the plural. The recitation of ranges of values herein is merely intended to serve as a shorthand method of referring individually to each separate value falling within the range. Unless otherwise indicated herein, each individual value is incorporated into the specification as if it were individually recited herein.

All systems described herein can be performed in any suitable order unless otherwise indicated herein or otherwise clearly contradicted by context. The use of any and all examples, or exemplary language (for example, "such as") provided with respect to certain embodiments herein is intended merely to better illuminate the application and does not pose a limitation on the scope of the application otherwise claimed. No language in the specification should be construed as indicating any non-claimed element essential to the practice of the application. Thus, for example, reference to "an element" can include two or more such elements unless the context indicates otherwise.

As used herein, the terms "optional" or "optionally" mean that the subsequently described event or circumstance can or cannot occur, and that the description includes instances where said event or circumstance occurs and instances where it does not.

The word or as used herein means any one member of a particular list and also includes any combination of members of that list. Further, one should note that conditional language, such as, among others, "can," "could," "might", or "may" unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Figure 4:
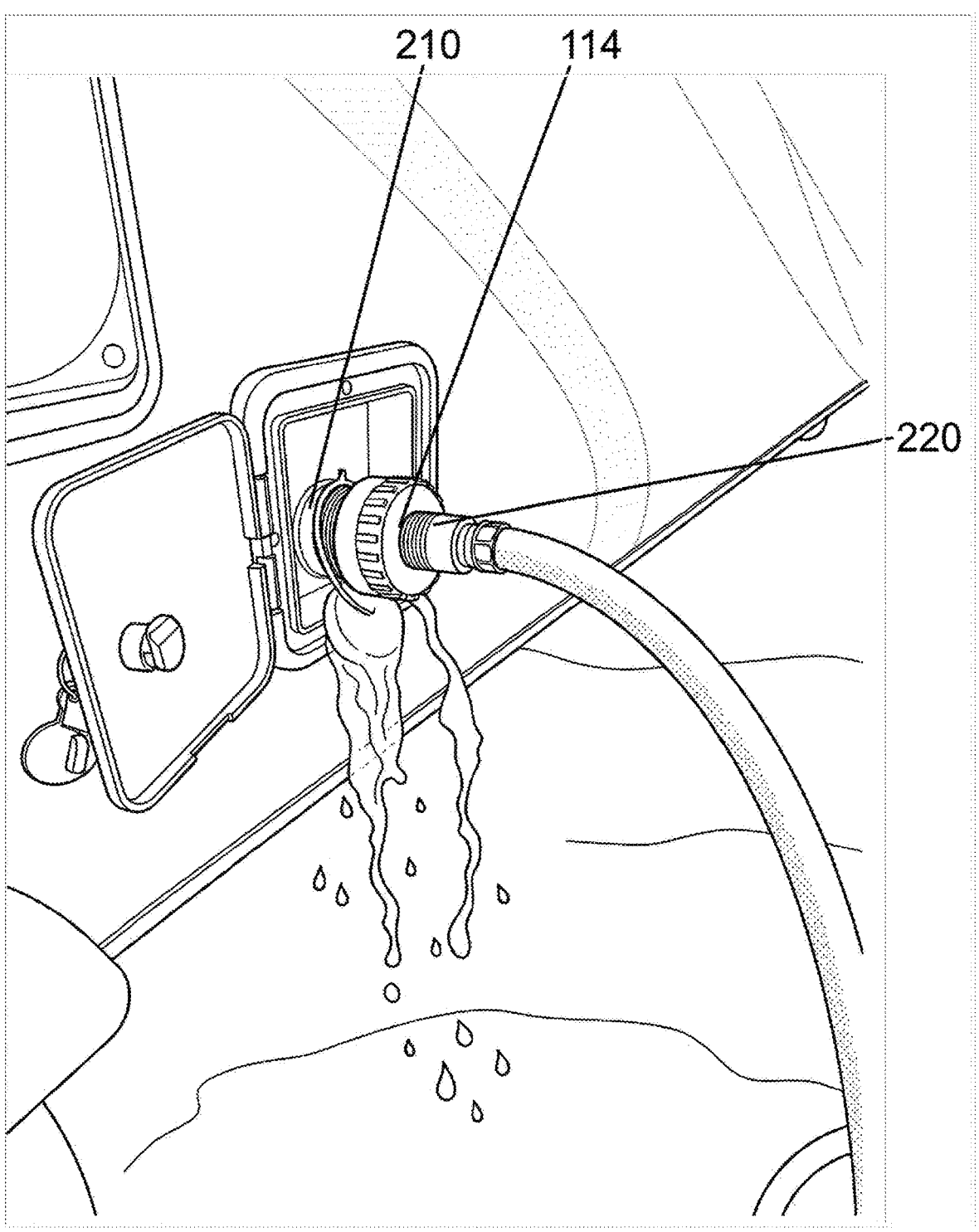
FIG. 4 depicts the apparatus in use, inserted into the fill port of the fresh water tank, according to one embodiment.

FIG. 1 shows a perspective view of an apparatus 100 for coupling a pressurized water supply to a recreational vehicle fresh water fill port 210 (see FIG. 4). In one embodiment, the apparatus 100 comprises a bayonet connector 118 adapted to engage with flanges on the fill port 210 (See FIG. 2). The bayonet connector 118 has a housing 119 with an inlet 112 configured to receive a standard garden hose or fresh water hose fitting 114, and an outlet 116. A deflection shroud 140 extends from the housing 119.

Figure 2:
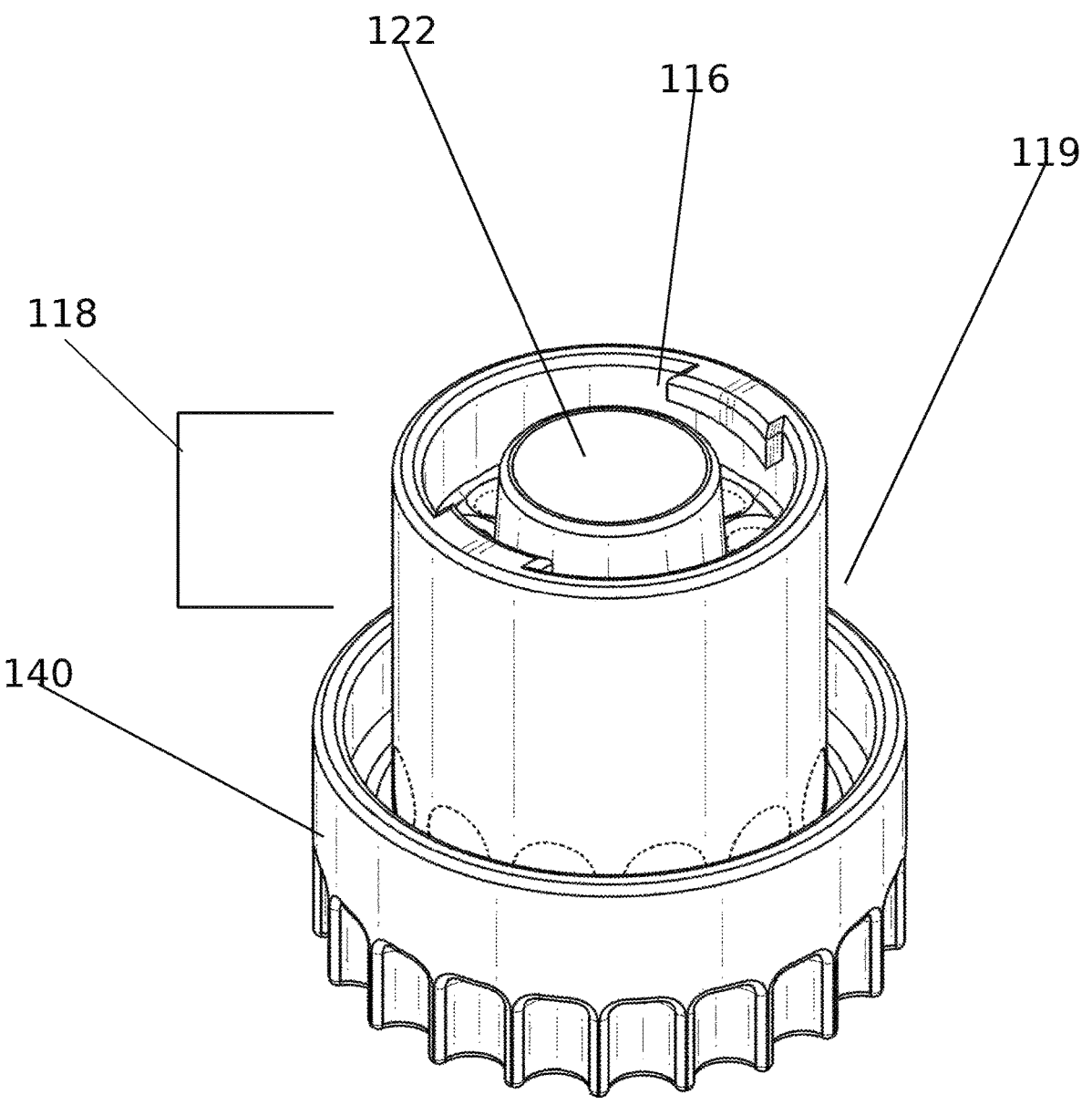
FIG. 2 provides another perspective view of the apparatus rotated to show the outlet facing upward, according to one embodiment.

With reference to FIG. 2, another perspective view of the apparatus 100 is provided, rotated to show the outlet 116 facing upward. In this embodiment, a venturi tube 122 is positioned within the housing 119 and fluidly connects the inlet 112 to the outlet 116, wherein the venturi tube 122 is shaped to accelerate water flow from the inlet 112 to the outlet 116.

Figure 3:
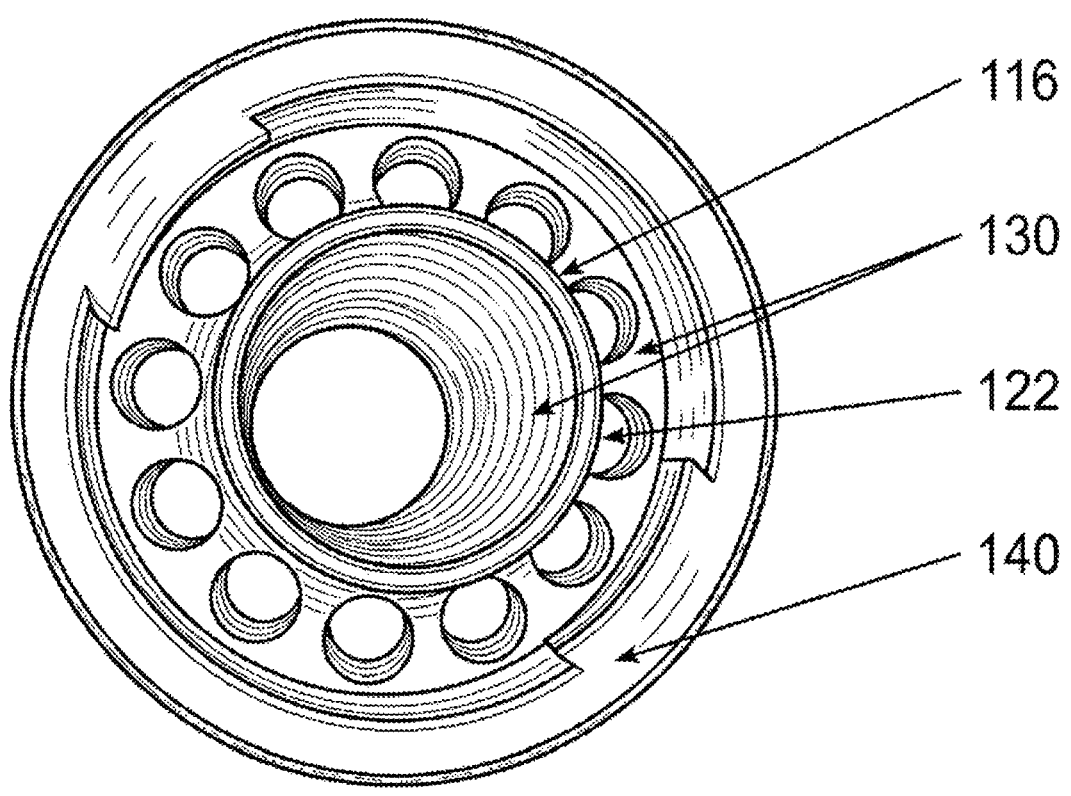
FIG. 3 is an aerial perspective view highlighting a plurality of vent ports formed in the housing and fluidly connected to the venturi tube, according to one embodiment.

As depicted in FIG. 3, an aerial perspective view highlights a plurality of vent ports 130 formed in the housing 119 and fluidly connected to the venturi tube 122. In some embodiments, the vent ports 130 are sized and positioned to allow venting of excess pressurized water supplied by the garden hose, thereby preventing pressurization of the recreational vehicle freshwater tank 200 (see FIG. 4). The deflection shroud 140 is positioned to redirect and decelerate water vented from the vent ports 130 away from a user. According to an embodiment, the vent ports 130 have a combined flow capacity greater than a maximum flow rate suppliable by the garden hose, such that the venturi tube 122 channels water to the fill port 210 without leakage under normal operating conditions.

The vent ports 130 are fluidly connected to the venturi tube 122 and allow excess water pressure from the garden hose to be released, thereby preventing over-pressurization of the recreational vehicle freshwater tank 200 (FIG. 4). Each vent port 130 has an entry diameter of 6 mm and an exit diameter of 10 mm, forming a venturi shape that decelerates the vented water as it passes through. The decelerated water then enters the deflection shroud 140, where gravity causes it to dribble harmlessly to the ground and away from the user. The vent ports 130 are sized to have a combined flow capacity exceeding the maximum flow rate of the garden hose, ensuring the venturi tube 122 can channel water to the fill port 210 without leakage during normal use.

FIG. 4 depicts the apparatus 100 in use, inserted into the fill port 210 of the fresh water tank (not shown). A garden hose 220 is connected to the fitting 114 on the inlet 112, supplying pressurized water.

In some embodiments, the apparatus includes additional features comprising vent ports 130 positioned radially around the venturi tube 122, and a deflection shroud 140 to direct vented water downward and away from the bayonet connector 118, which is equipped with a sealing gasket (not shown) to prevent leakage at the connection with the fill port 210. The housing 119 is constructed from a UV-resistant polymer material and includes a built-in lanyard hole (not shown) for securing the apparatus 100 during use. In another embodiment, the venturi tube 122 has a converging-diverging nozzle shape to optimize water flow acceleration, while the deflection shroud 140 features a textured outer surface 142 to improve grip during attachment and removal.

In one embodiment, the apparatus 100 constitutes a coupling device for transferring pressurized water from a hose 220 to a gravity-filled tank (not shown). It comprises a connector body 110 with the hose-receiving portion 112, tank-connecting portion 116, and main conduit 120 fluidly connecting them. The vent apertures 130 and deflector 140 form a passive overpressure prevention system integrated into the connector body 110, wherein the vent apertures 130 have a total flow capacity exceeding the maximum flow deliverable by the hose 220.

The embodiments described herein are given for the purpose of facilitating the understanding of the present invention and are not intended to limit the interpretation of the present invention. The respective elements and their arrangements, materials, conditions, shapes, sizes, or the like of the embodiment are not limited to the illustrated examples but may be appropriately changed. Further, the constituents described in the embodiment may be partially replaced or combined together.

What is claimed is:

1. A coupling device for transferring pressurized water from a hose to a gravity-filled tank, comprising:
  a. a connector body having:
    i. a hose-receiving portion with a fitting compatible with a standard garden hose or fresh water hose,
    ii. a tank-connecting portion with a releasable bayonet mount adapted to engage a fill port of the gravity-filled tank,
    iii. a main conduit fluidly connecting the hose-receiving portion to the tank-connecting portion;
  b. a passive overpressure prevention system integrated into the connector body, including:
    i. at least one vent aperture fluidly coupled to the main conduit, the vent apertures configured to open and release water when pressure in the main conduit exceeds a threshold, ii. a deflector extending from the connector body adjacent to the vent apertures, the deflector positioned to intercept and redirect water released from the vent apertures; and
  c. wherein the vent apertures have a total flow capacity exceeding a maximum flow deliverable by a garden hose attachable to the hose-receiving portion, such that the main conduit remains substantially unpressurized.

2. The coupling device of claim 1, wherein the vent apertures are positioned radially around the main conduit.

3. The coupling device of claim 2, wherein the deflector is configured to direct released water downward and away from the bayonet mount.

4. The coupling device of claim 3, wherein the connector body is constructed from a UV-resistant polymer material.

5. The coupling device of claim 3, further comprising a built-in lanyard hole for securing the coupling device during use.

6. The coupling device of claim 3, wherein the main conduit has a venturi tube with a converging-diverging nozzle shape to accelerate water flow from the hose-receiving portion to the tank-connecting portion.

7. The coupling device of claim 3, wherein the bayonet mount includes a sealing gasket to prevent leakage at the connection with the fill port of the gravity-filled tank.

8. The coupling device of claim 3, wherein the deflector has a textured outer surface to improve grip during attachment and removal of the coupling device.

\* \* \* \* \*